United States Patent [19]
Carpenter

[11] Patent Number: 5,416,676
[45] Date of Patent: May 16, 1995

[54] FISHING LIGHT

[76] Inventor: Glenn M. Carpenter, 1805 Pecan Orchard Rd., League City, Tex. 77573

[21] Appl. No.: 208,966

[22] Filed: Mar. 9, 1994

[51] Int. Cl.$^6$ ................................................. F21S 3/00
[52] U.S. Cl. ..................................... 362/158; 362/223
[58] Field of Search ......................... 362/223, 224, 158

[56] References Cited

U.S. PATENT DOCUMENTS

| | | | |
|---|---|---|---|
| 1,338,528 | 4/1920 | Reinewald . | |
| 2,691,092 | 10/1954 | McConnell et al. . | |
| 2,760,053 | 8/1956 | Choisser . | |
| 2,779,866 | 1/1957 | Burlingham | 362/267 |
| 3,474,243 | 10/1969 | Miller | 367/267 |
| 4,262,327 | 4/1981 | Kovacik et al. | 362/362 |
| 4,429,350 | 1/1984 | Guthrie . | |
| 4,598,346 | 7/1986 | Bodde | 362/267 |
| 4,644,453 | 2/1987 | Vest | 362/223 |
| 4,947,304 | 8/1990 | Payne et al. | 362/267 |
| 5,133,145 | 7/1992 | McDonald | 43/17.5 |
| 5,140,216 | 8/1992 | Parr | 362/22 |
| 5,213,410 | 5/1993 | Acks | 362/269 |

FOREIGN PATENT DOCUMENTS 780725 3/1968 Canada .

*Primary Examiner*—Carroll B. Dority
*Attorney, Agent, or Firm*—Guy McClung

[57] ABSTRACT

A new light device is disclosed which, in one aspect, has clear housing in which one or more tubular bulbs is positioned which has sockets and/or bulb mounts at each end, one or both of which prevent rotation of the tubular bulb in the housing. Fittings encapsulate each bulb end and socket/mount combination. In one aspect, a torque isolation member is used with a first top fitting. The top fitting is mated with a second top fitting so that the bulb(s) are clamped, held, and stabilized within the housing and so that such rotation does not result in rotation of the bulb(s) within the housing. In one embodiment a fluorescent bulb (or bulbs) is used and a ballast is interconnected with electrical conductors leading to the bulb. In one aspect the ballast is within the housing and in another aspect a battery is also within the housing. In one aspect the housing and related fittings are sealed so that the bulb(s) is within a water-tight enclosure. In certain embodiments bulb sockets are irregularly shaped and are received in irregularly shaped recesses in bottom bulb mounts so that only one correct orientation of the socket(s) with respect to the recess(es) is possible, thus serving as a guide for correct bulb positioning and as an indicator of correct bulb placement and orientation. In one aspect a bulb, a socket, and associated wiring are combined to form an easily removable and replaceable unit.

19 Claims, 4 Drawing Sheets

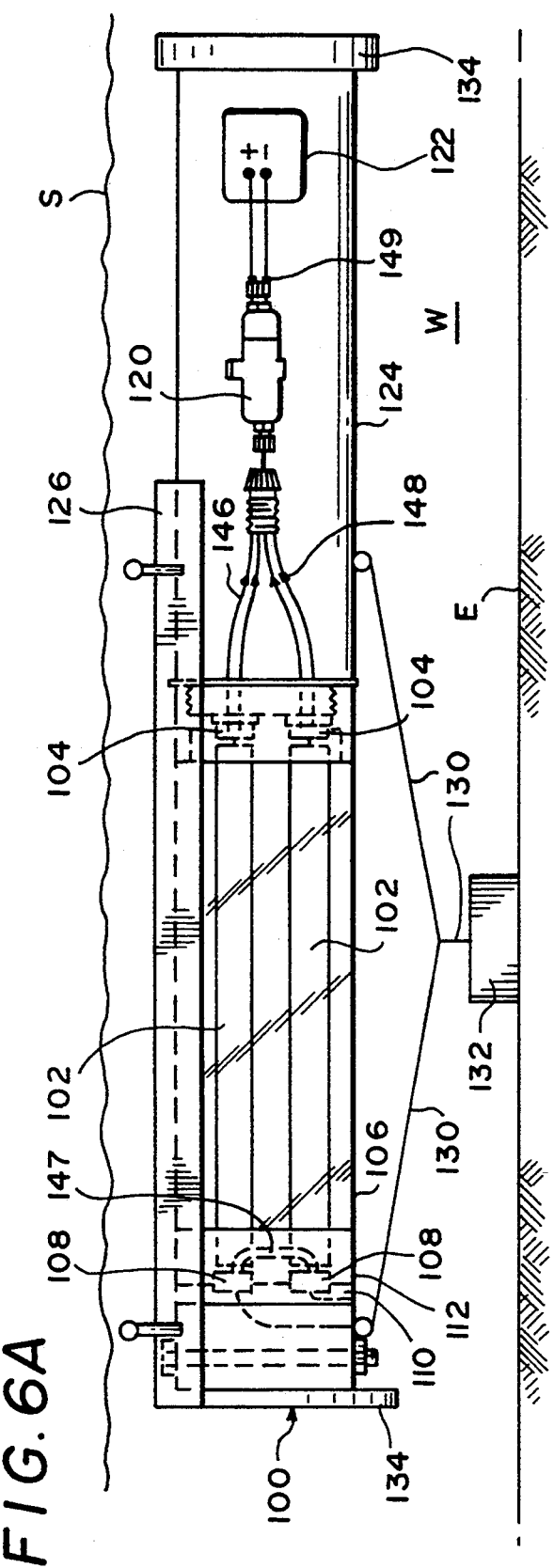
FIG. 6A
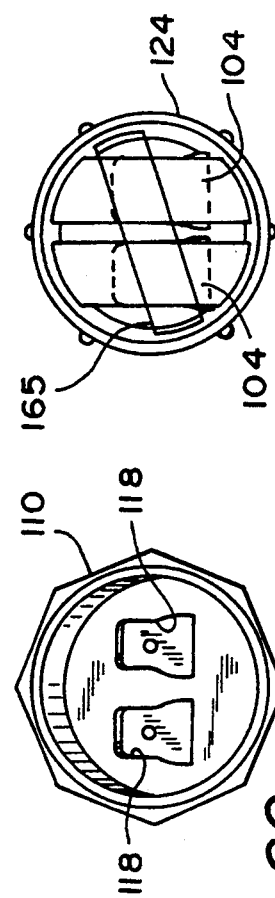
FIG. 6D
FIG. 6C
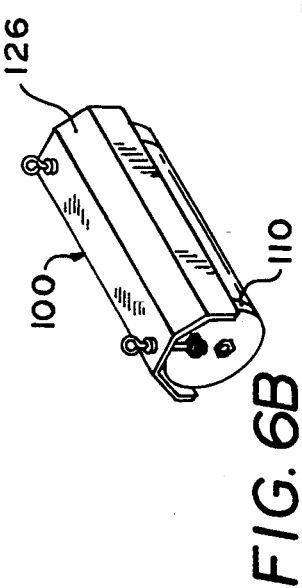
FIG. 6B

FISHING LIGHT

BACKGROUND OF THE INVENTION

1. Field of the Invention

This invention is related to portable lights, to fishing lights, and in one aspect to submersible fluorescent fishing lights.

2. Description of Related Art

The prior art discloses a variety of submersible fishing lights. U.S. Pat. No. 1,338,528 discloses a submersible light for fishing which has a water-tight housing within which is mounted a lamp bulb and batteries. An anchoring weight is suspended by a cable from a bail secured to the housing.

U.S. Pat. No. 2,779,866 discloses an underwater fishing light which has a globe which is secured to a tube with a water tight seal. A lamp bulb is positioned in a lamp socket in the globe and electrical wire extends from the socket and through the tube.

U.S. Pat. No. 3,474,243 discloses an underwater lamp with a bulb mounted within a protective glass tube. Compression fittings are used to clamp a reflector below the bulb and sealing gaskets and O-rings provide a water-tight tube interior for the bulb.

U.S. Pat. No. 4,429,350 discloses an underwater illumination device with an elongated handle through which extends electrical conductors for transmitting electricity to a light mounted at one end of the handle in a water-tight transparent cover. Clips at the other end of the conductors outside the handle may be attached to a battery. A float means is a mounted on the handle adjacent the light.

U.S. Pat. No. 4,598,346 discloses a submersible fishing light in which electrical components are sealed in a water-tight impervious plastic shell. A bulb's socket end extends into the shell and its neck is sealed with a sponge ring.

U.S. Pat. No. 4,947,304 discloses an underwater lighting with a lamp having a filament, an envelope surrounding the filament, a pair of contacts extending through the envelope, and a wiring arrangement for electrically connecting the contacts to a source of electrical power. The wiring arrangement has a socket assembly on which the lamp is removably retained through a friction fit connection between the contacts of the lamp and a pair of terminals of the socket assembly and includes a transparent casing having an open axial end and a closure member retained in the open axial end. The closure member may be removed from the open axial end of the casing to permit replacement of the lamp in the socket assembly.

U.S. Pat. No. 5,113,145 discloses a lighted submersible fish attracting device in which live bait is encapsulated in a clear container. The combined direct spot-lighting of the baitfish, and reflected flood-lighting of an area, provides visibility and attraction, concurrently with centralized attraction and focusing around the baitfish. The device has underwater dynamic vertical plumb stabilization for improved dynamic handling and for elimination of tumbling during rapid submersion under water and has a handle-to-powercord attachment, linear depth measurement marks on the powercord, and the direct usage as a minnow bucket, as a handheld spotlight, and as a floating utility light.

U.S. Pat. No. 5,213,410 discloses an underwater illumination apparatus for use in nuclear facilities which has a high pressure sodium arc lamp sealed to a stainless steel base with a flexible, radiation-resistant seal to provide a watertight and shock-absorbing connection. A wet-mateable base connector is attached to the base to permit connection to a lower cable. A light-transmissive, impact-resistant cover is formed around the base and the arc lamp. The cover has holes through which water can flow in and out to conduct heat away from the arc lamp. The combination is a modular unit which is replaced as a whole when the arc lamp burns out. The lower cable which provides power to the arc lamp is attached at its other end to a ballast power supply which is hermetically sealed in a stainless steel housing. Wet mateable connectors are attached at the inlet and outlet of the ballast power supply to attach to the lower cable and to the upper cable connection to a 120 VAC source. A number of units may be assembled with a single reflector to create a light ring.

Canadian Patent 780,725 discloses a submersible light fixture for fishing with a hollow body open at both ends and a fluid-tight partition that defines two compartments in the hollow body. An electric bulb socket in a lower compartment has electrical terminal posts extending into an upper compartment. The upper compartment has a sealing cover and an opening for insertion of an electric cord. The lower compartment has a lateral oil filling opening with a removable sealing plug. A bulb is sealingly secured in to a socket.

SUMMARY OF THE PRESENT INVENTION

The present invention, in one embodiment, teaches a submersible fishing light with a clear plastic tube in which is positioned a tubular light bulb, preferably a fluorescent bulb. At one end the bulb is mounted to a first bulb mount which has a recess in which an end of a fluorescent bulb socket is held. A first fitting is sealingly disposed around the first bulb mount and a weight may be connected to the fitting. The other end of the bulb is also disposed in a fluorescent bulb socket and this socket has extending arms which abut protrusions on an enclosing fitting to hold the socket in place. A second fitting is screwable into the first with a gasket therebetween to sealingly clamp the bulb in place in the clear plastic tube. To isolate the top socket from the torsion applied by the second fitting, a torque isolation member is, preferably, placed between the top socket and the second fitting. The torque isolation member may turn with respect to the top socket due to rotation of the second fitting, but the turning of the second fitting has little or no torsional effect on the top socket due to the presence of the torque isolation member. Suitable sealing gaskets are used between the various mating parts and sealant is applied to exposed joints so that the device is water-tight. An electrical cord extends from the device's interior sealingly through a hole in a top fitting and then, in one embodiment, to an electrical ballast (inside or outside the fittings or the clear plastic tube) for the fluorescent bulb. In one aspect a twelve volt DC battery provides power to the ballast. In one aspect, electrical conductors extend from the bottom socket, from the top socket, and into the top fitting where they are interconnected with a multi-conductor input fluorescent ballast electrical cord for transmitting electricity to the bulb. Use of fluorescent bulbs results in the production of relatively less heat than incandescent bulbs and the danger of fire or explosion is reduced.

In certain embodiments the interior of the clear plastic tube is sufficiently large so that air therein provides buoyancy to the entire light device so it will float in or on water. The use of two interconnectible top fittings makes it possible to change bulbs. In another embodiment the electrical ballast is disposed within the device and in yet another device the battery is also disposed within the device. In certain embodiments more than one bulb is used within a single tube. In one aspect the ballast is mounted in a sealed water-tight housing and may itself be submerged. In another aspect there is sufficient length of the electrical cord between the light and the ballast that the ballast need not be submerged. In embodiments in which electrical connections, sockets, and bulbs ends are sealed, no outer protective tube is required, or a tube may be used which is not water-tight.

In other embodiments the device may be used as a portable light without the water-tight seals, connections, parts and fittings, but without submerging the device in water. In one embodiment either part of the plastic tube may be opaque or a partial shield may be used in the tube or outside of it to either direct light, reduce the extent of the lighted area, or both. In one embodiment the device, the light only, and/or the battery and ballast are mounted to, beneath or on a float, innertube, or other buoyant member. Appropriate weights may be used so that the device is suspended at a desired depth in water.

Preferably sockets are used with an irregular shape and mount recesses for the sockets correspond in shape to the irregular shape of the sockets so that there is only one correct orientation which permits a socket to enter a recess to insure correct bulb orientation and disposition.

It is, therefore, an object of at least certain preferred embodiments of the present invention to provide:

New, useful, unique, efficient, nonobvious portable lighting devices and, in one aspect, submersible fishing lights;

Such devices with sealed removable fittings for changing bulbs;

Such devices in which torsional effects of rotating fittings are isolated from a bulb mount(s) or socket(s);

Such devices with two or more bulbs, most preferably fluorescent bulbs;

Such devices with an end fitting with a portion thereof for protecting therein a connector for connecting a weight to the device;

Such devices which include easily removable and replaceable bulb(s) and associated items;

Such devices in which a battery (or batteries) is the sole power source and, in one aspect, a battery (or batteries) are mounted in a fitting or housing adjacent the bulb(s); and Such devices including a sealed electrical ballast either in a clear tube with the bulb(s), or in a sealed housing adjacent the bulbs, or in a separate sealed housing spaced apart from the clear plastic tube.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of certain embodiments of the invention briefly summarized above may be had by reference to the embodiments which are shown in the drawings which form a part of this specification. These drawings illustrate certain preferred embodiments and are not to be used to improperly limit the scope of the invention which may have other equally effective or legally equivalent embodiments.

FIG. 6A is a side schematic view of a light device according to the present invention. FIG. 6B is an end perspective view of the device of FIG. 6A. FIG. 6C is a top view of a bottom socket mount of the device of FIG. 6A. FIG. 6D is a top view of a top socket mount of the device of FIG. 6A.

DESCRIPTION OF EMBODIMENTS PREFERRED AT THE TIME OF FILING FOR THIS PATENT

Figure 1:
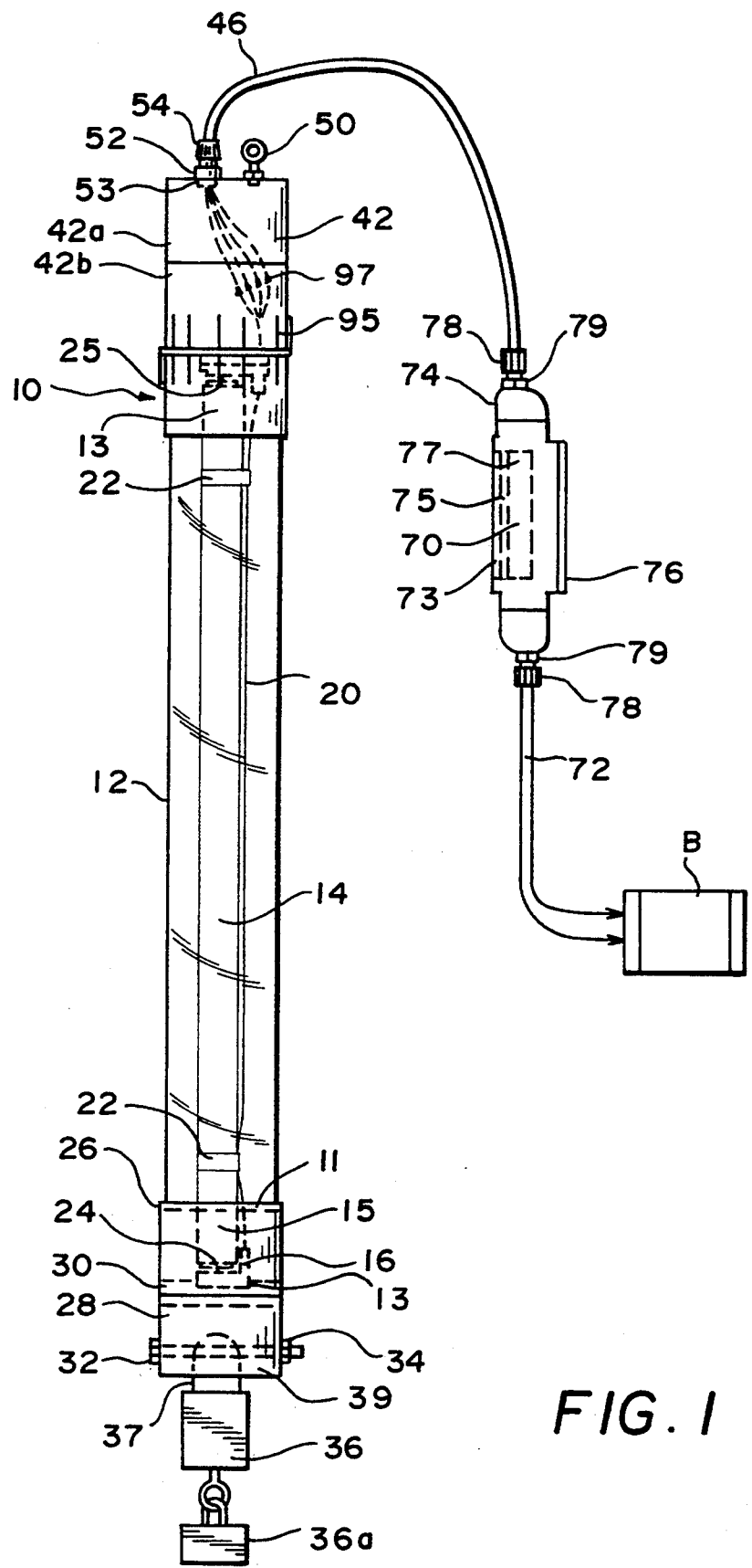
FIG. 1 is a side view of a light device according to the present invention.
Figure 2:
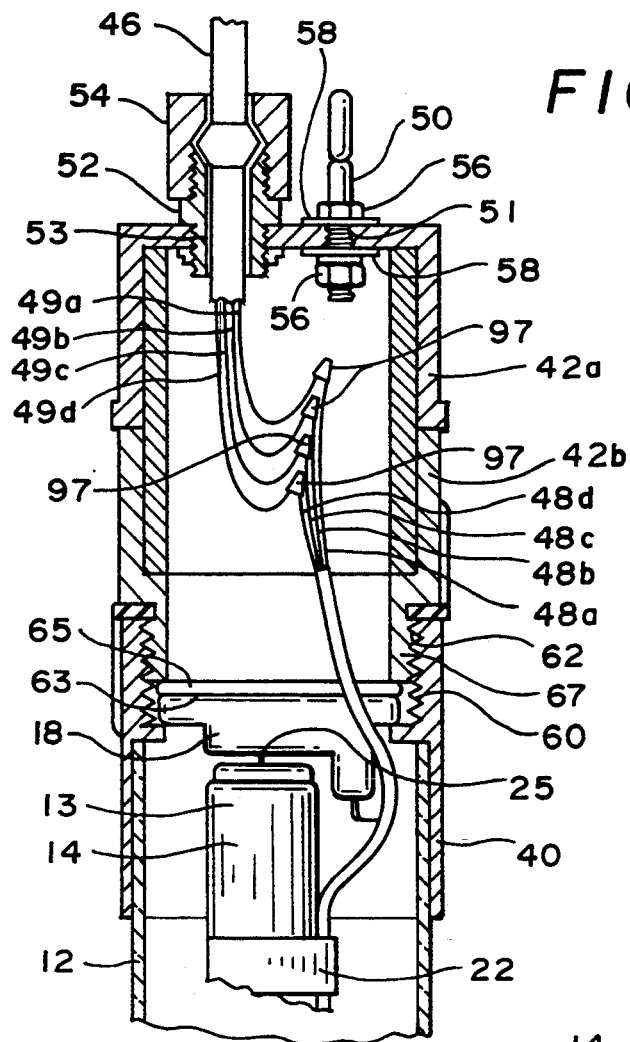
FIG. 2 is a cross sectional view of the top of the device of FIG. 1.
Figure 3:
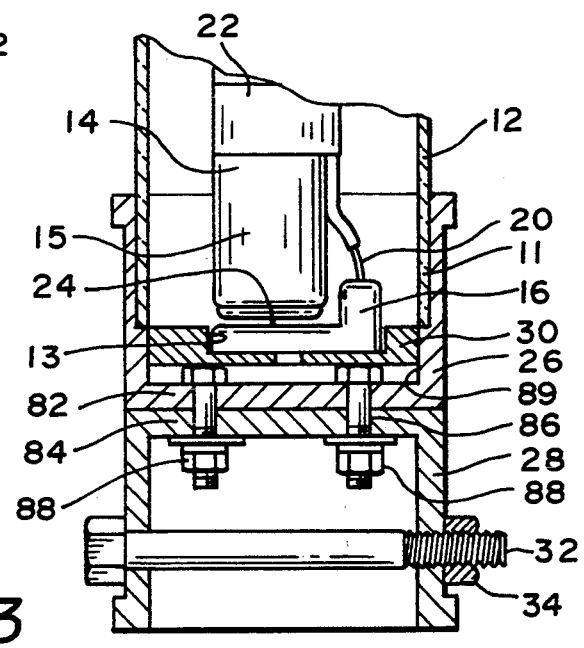
FIG. 3 is a cross sectional view of the bottom of the device of FIG. 1.

Referring now to FIG. 1, a light device 10 has a transparent rigid tube 12, e.g. in one embodiment made from a clear acrylic tube about three inches in diameter and about one-eighth of an inch thick. At least one tubular light bulb 14 [e.g. a forty-eight inch long tubular fluorescent bulb (such as a commercially available Phillips FAOT12G Fluorescent 40 watt bulb; a 4400 lumen Phillips Preheat-Rapid Start 39632-5 F40G Green bulb with an average life of 20,000 or more hours; or a 5000 lumen EX50 bulb from Panasonic Co.)] is disposed within the tube 12. A first end 15 of the bulb 14 has electrical poles 24 (one shown) which are electrically connected to and received and held in an electrical bottom socket 16. The bottom socket 16 rests in a socket recess 13 of a bottom socket mount 30. A bottom fitting 16 surrounds part of the mount 30 and is sealed in contact with an end 11 of the tube 12. A bottom cap 28 is secured to the mount 30, e.g. by threaded engagement, adhesive, or bolts through corresponding opposed end plates (see FIG. 3). A bolt 32 secured by a nut 34 passes through the bottom cap 28 and supports at least one weight 36. In one aspect another weight 36a is attached to the weight 36. A shank 37 removably secured to the weight 36 is partially enclosed in a skirt portion 39 of the bottom cap 28. This skirt protects the shank and reduces the possibility of its being jarred loose if the light hits and object.

Electrical wiring 20 extends from the bottom socket 16 and its poles to a top socket 18 and its associated electrical conductor poles. As desired, strips of adhesive glass cloth tape 22 are used to hold the wiring 20 to the bulb 14. Electrical conductor poles 25 (typical 2-pole fluorescent bulb end) of a top end 13 of the bulb 14 are received in the top socket 18. The conductor poles 25 are electrically connected in the socket 18. Within a top cap 42 the wiring 20, with individual wire conductors 48a, b, c, and d, is connected to corresponding wires 49a, b, c, d of an input electrical cord 46 and plastic cap connectors 97 assist in securing the wire conductor ends together. The cord 46 is sealingly held in a cord fitting 52 secured in a hole 53 in the top cap 42 by a cord fitting cap 54 which is threadedly engaged to and tightened on the cord fitting 52. An eye bolt 50 (optional for designs according to this invention of a light and/or light housing; preferably stainless steel) is held in a hole 51 in the top cap 42 by nuts 56 and the hole is sealed by gaskets 58. The top cap 42 has threads 62 which engage threads 60 of the top fitting 40. An end 9 of the tube 12 is secured and sealed within and to the top fitting 40.

The electrical cord 46 extends to an electrical light ballast 70 [e.g. a ThinLite 40 watt, 12 volt DC ballast No. 153691]. A primary cord 72 electrically connected to the ballast 70 provides 12 volt DC current, e.g. from a 12 volt battery or battery charger B, to the ballast 70. The output of the ballast 70 for the bulb 14 is, in one embodiment 12 volt, 2.7 amp current.

Preferably, in one embodiment, the caps and fittings are made from tubular PVC; gaskets are made from neoprene; and all metal parts, bolts, nuts, etc. (exposed and non-exposed) are stainless steel. The electrical cords are preferably, in one embodiment, waterproof and a housing 74 of the ballast 70 is made from PVC with a removable sealed access door 76. General Electric Co. 660 watt, 600 volt bi-pin bulb sockets may be used for the sockets 16, 18 and the wiring 20 is, in one embodiment, 2/C No. 18 AWG, 200 degree centigrade NEC 725-1(b) wire. Dow Corning RTV silicone sealant No. 732 is used in a bottom end of a bottom fitting. Tire seal PVC primer and glue No. T64-04 is used at joints between PVC parts and acrylic parts. AGS Line Dielectric Silicone Compound No. DS-1 is used preferably, on all electrical connections and sockets. Cords are connected to the ballast's ends with PVC cord caps 78 secured to end fittings 79. Preferably, in one embodiment the ballast member 77 is mounted on a metal plate, e.g. an aluminum plate 75 (acting as a mount and a heat sink) which is positioned over a layer of dielectric silicone 73 for dryness and heat dissipation. The top cap 42 may be one piece or may be made of two pieces 42a and 42b secured or glued together.

A torque isolation member 65 is interposed between a top member 63 secured to or formed integrally of the socket 18 and an end 67 of the top cap 42. When the top cap 42 is rotated to clamp the sockets and bulbs in place and hold and stabilize them within the tube 12, the torque isolation member 65 isolates the socket 18 from torsion induced by the rotating cap, e.g. in embodiments of this invention in which no adhesive or additional members are used to inhibit rotation of the socket.

Figure 4:
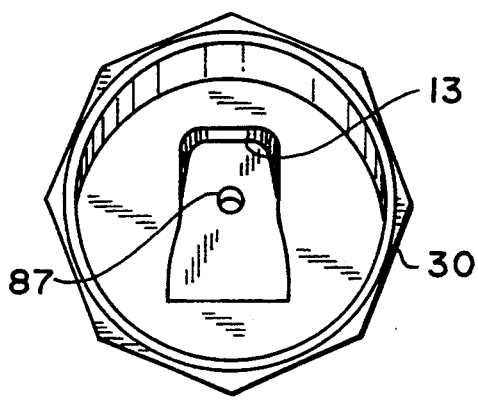
FIG. 4 is a top view of a bottom socket mount of the device of FIG. 1.

FIG. 4 illustrates one embodiment of a bottom socket mount 30 with a socket recess 13 therein. A weep hole 87 is provided so that an excess amount of silicone sealant may be placed in space in an end 89 of the bottom fitting 26 on the end plate 82 and then, as the mount 30 is pushed into the end 89, excess sealant pushes through the weep hole 87, insuring that the space between the mount 30 and the plate 82 is filled and sealed. Bolts 86 secured with nuts 88 hold an end plate 82 of the bottom fitting 26 to and against an end plate 84 of the bottom cap 28 and gaskets 87 help seal the bolt holes.

Figure 5:
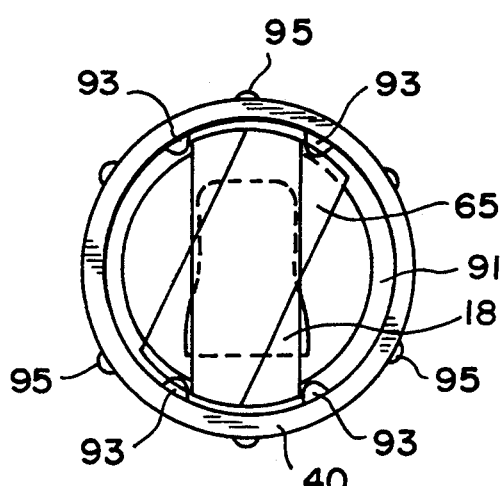
FIG. 5 is a top view of a top socket mount of the device of FIG. 1.

FIG. 5 shows the co-action of the top socket 18 and the torque isolation member 65. Ends of the top of the socket 18 are positioned between protrusions 93 on the interior of the fitting 40 (e.g. hardened amounts of cement or glue, or integrally formed structural members) which prevent the top socket 18 from rotating. The torque isolation member 65 is free to rotate above the socket 18 and acts as a spacer to insure that the socket 18 (and hence the bulb itself) is firmly held in place. Exterior ribs 95 facilitate manipulation and rotation of the fitting 40.

FIG. 6A-6D illustrate schematically a submersible light device 100 in water W below a surface S thereof and above the earth E. Two (or more) fluorescent tubular light bulbs 102 are mounted to electrical sockets 104, 108 within a clear tube 106. The sockets 108 are held in a mount 110 (like the bottom mount 30 described above). An end cap 112 surrounds the mount 110 and sockets 108. The other ends of the bulbs 102 are electrically connected to the sockets 104. An electrical ballast 120 (like the ballast 70) and a battery 122 are both sealingly held within an end fitting 124 which also surrounds the socket 108. The battery 122 provides power to the tubular light bulbs. An opaque shield 126 on a top side of the tube 106 reflects light downwardly. Alternatively, the interior of the tube 106 can be coated with a dark, opaque coating or with a reflective coating to achieve a limited range (e.g. between ten degrees and three hundred and fifty degrees) of light emission rather than a full three hundred and sixty degree range around the tube 106. The side of the shield 126 facing the exterior of the clear tube may be coated with a reflective coating or have reflective material secured thereto. Tether lines 130 are connected to a weight 132 which holds the device 100 in position while buoyant float members 134 hold it above the bed E in the water W. In one embodiment, no float members are used and the device floats solely due to the presence of air sealed in the tube 106. FIG. 6C illustrates mount 110 with two recesses 118 shaped and size to receive and hold the two sockets 108. FIG. 6D illustrates the end fitting 124 holding the two sockets 104 and a torque isolation member 165 therein which functions like the previously described torque isolation member. Electrical wiring apparatus 146, 147, 148 interconnects the ballast with the bulbs and a cord 149 interconnects the ballast with the battery.

Figure 8:
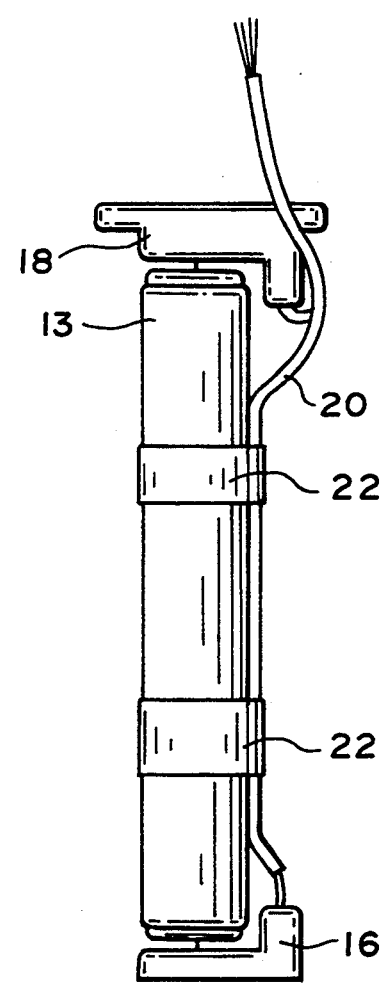
FIG. 8 is a side view of a light assembly according to the present invention.

An entire combination of a tubular bulb, sockets in which are mounted bulb poles, and associated electrical wiring (see FIG. 8) may be easily removed from a clear rigid housing according to this invention by unscrewing one top fitting (or end fitting from an end with dual fittings) and lifting the bulb and related items from the housing. A new bulb and related items may then be inserted back into the housing with the bottom socket recess acting as a guide and seating of a socket therein acting as an indicator of correct bulb position.

Figure 7:
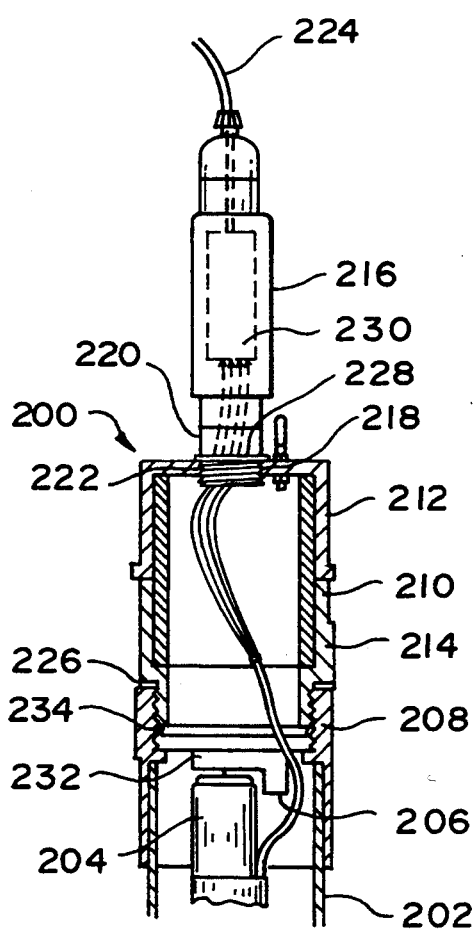
FIG. 7 is a partial side view in cross section of a light device according to the present invention.

FIG. 7 illustrates a lighting device 200 which is partially shown. The parts of the device not shown are like the device shown in FIGS. 1–5. The device 200 has a transparent tubular housing 202, a fluorescent bulb 204, associated wiring 206, socket 232, torque isolation member 234, a primary end fitting 208, and a secondary end fitting 210. The secondary end fitting 210 is comprised of a top part 212 secured to a bottom part 214. A ballast housing 216 is sealingly connected to the top part 212 of the secondary end fitting 210. Threads 218 on a housing end 220 mate with threads 222 of the top end part 212. A ballast 230 (like previously described ballasts) is mounted in the housing 216 and an electrical conductor cord apparatus 224 extends from the ballast 230 and outside the housing 216. Neoprene gaskets are disposed between the primary and secondary fittings (gasket 226) and between the secondary end fitting 210 and the housing 216 (gasket 228). As with other devices previously described, the bulb 204, wiring 206, and socket 232 form a combination (with a bottom end socket, not shown) which is easily removable from the housing 202 when the secondary end fitting is separated from the primary end fitting.

Lighting devices according to this invention may be watertight or not, submersible or not. Such lighting devices may be used underwater for fishing, mounted on a boat for floundering, or underwater for diving. They are also convenient for use, inter alia, for emergency lighting or signalling, area lighting, lighting of campgrounds, and boating; and in such environments water-tight embodiments withstand severe weather conditions.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A submersible lighting device comprising:
   a transparent rigid housing,
   an input electrical cord for providing power to the device,
   a fluorescent tubular light bulb disposed within the housing, the tubular light bulb having a first end and a second end,
   a first bulb socket to which is electrically connected the first bulb end and a second bulb socket to which is connected the second bulb end,
   a first socket mount within the housing on which is non-rotatively mounted the first bulb socket,
   electrical power conducting apparatus connected to the first bulb socket and connected to the second bulb socket,
   a first hollow fitting sealingly secured about the first socket mount,
   a second hollow fitting sealingly secured about the second socket mount, the electrical conducting apparatus extending sealingly from the housing through the second hollow fitting and exteriorly of the second hollow fitting,
   a third hollow fitting matingly and releasably secured to the second fitting, the electrical conducting apparatus connected to the input electrical cord which transmits electricity to the tubular light bulb, the input electrical cord extending from outside the device into the third hollow fitting through a hole therein,
   an electrical fluorescent bulb ballast interconnected with the input electrical cord,
   the third hollow fitting having an extending end which abuts the second bulb socket to hold the second bulb socket, the tubular light bulb, and the first bulb socket tightly in place in the transparent rigid housing, and
   the first socket mount having a recess therein configured to receive the first bulb socket in only one orientation and for holding the first bulb socket non-rotatively therein.

2. A submersible lighting device comprising:
   a transparent rigid housing,
   at least two tubular fluorescent light bulbs disposed within the housing, the bulbs each having a first end and a second end,
   for each bulb a first bulb socket to which is electrically connected the first bulb end and a second bulb socket to which is connected the second bulb end,
   for each bulb a first socket mount within the housing on which is non-rotatively mounted the first bulb socket,
   electrical power conducting apparatus connected to the first bulb sockets and connected to the second bulb sockets,
   a first hollow fitting sealingly secured about the first sockets mount,
   a second hollow fitting sealingly secured about the second socket mounts, the electrical conducting apparatus extending sealingly from the housing through the second hollow fitting and exteriorly of the second hollow fitting,
   a third hollow fitting matingly and releasably secured to the second fitting, the electrical conducting apparatus connected to an input electrical cord which transmits electricity to the bulbs, the input electrical cord extending from outside the device into the third hollow fitting through a hole therein,
   electrical fluorescent bulb ballast apparatus interconnected with the input electrical cord,
   the third hollow fitting having an extending end which abuts the second bulb sockets to hold the second bulb sockets, the bulbs, and the first bulb sockets tightly in place in the transparent rigid housing, a torque isolation member interposed between the extending end of the third hollow fitting and a top of the second bulb sockets, a battery for providing power to the bulbs, the battery interconnected electrically to the electrical conducting apparatus, the first socket mounts having a recess therein configured to receive the first bulb sockets in only one orientation and for holding the first bulb sockets non-rotatively therein, and each light bulb, corresponding sockets, and corresponding electrical power conducting apparatus comprising a combination which is removable together from the transparent rigid housing through the second hollow fitting.

3. The submersible lighting device of claim 2 further comprising:

the battery mounted within the second hollow fitting, the ballast apparatus mounted within the second hollow fitting, the transparent rigid housing and hollow fittings are sealed water tight, and an opaque member for preventing light from being transmitted in a selected arc from the tubular light bulb, the opaque member comprises a shield mounted to the device exteriorly of the transparent rigid housing.

4. A lighting device comprising:

a transparent rigid housing, a tubular light bulb disposed within the housing, the tubular light bulb having a first end and a second end, a first bulb socket to which is electrically connected the first bulb end and a second bulb socket to which is connected the second bulb end, a first socket mount within the housing on which is non-rotatively mounted the first bulb socket, electrical power conducting apparatus connected to the first bulb socket and connected to the second bulb socket, a first hollow fitting sealingly secured about the first socket mount, a second hollow fitting sealingly secured about the second socket mount, the electrical conducting apparatus extending sealingly from the housing through the second hollow fitting and exteriorly of the second hollow fitting, and a third hollow fitting matingly and releasably secured to the second fitting, the electrical conducting apparatus connected to an input electrical cord which transmits electricity to the tubular light bulb, the input electrical cord extending from outside the device into the third hollow fitting through a hole therein.

5. The device of claim 4 further comprising the tubular light bulb comprising a fluorescent bulb, and an electrical fluorescent bulb ballast interconnected with the input electrical cord.

6. The device of claim 4 further comprising the third hollow fitting having an extending end which abuts the second bulb socket to hold the second bulb socket, the tubular light bulb, and the first bulb socket tightly in place in the transparent rigid housing.

7. The device of claim 6 further comprising a torque isolation member interposed between the extending end of the third hollow fitting and a top of the second bulb socket.

8. The device of claim 4 further comprising a battery for providing power to the tubular light bulb, the battery interconnected electrically to the electrical conducting apparatus.

9. A lighting device comprising:

a transparent rigid housing, a tubular light bulb disposed within the housing, the tubular light bulb having a first end and a second end, a first bulb socket to which is electrically connected the first bulb end and a second bulb socket to which is connected the second bulb end, a first socket mount within the housing on which is non-rotatively mounted the first bulb socket, electrical power conducting apparatus connected to the first bulb socket and connected to the second bulb socket, a first hollow fitting sealingly secured about the first socket mount, a second hollow fitting sealingly secured about the second socket mount, the electrical conducting apparatus extending sealingly from the housing through the second hollow fitting and exteriorly of the second hollow fitting, a third hollow fitting matingly and releasably secured to the second fitting, the electrical conducting apparatus connected to an input electrical cord which transmits electricity to the tubular light bulb, the input electrical cord extending from outside the device into the third hollow fitting through a hole therein, and a battery for providing power to the tubular light bulb, the battery interconnected electrically to the electrical conducting apparatus, the battery mounted within the housing or within the second hollow fitting.

10. A lighting device comprising a transparent rigid housing, a tubular fluorescent light bulb disposed within the housing, the tubular light bulb having a first end and a second end, a first bulb socket to which is electrically connected the first bulb end and a second bulb socket to which is connected the second bulb end, a first socket mount within the housing on which is non-rotatively mounted the first bulb socket, electrical power conducting apparatus connected to the first bulb socket and connected to the second bulb socket, a first hollow fitting sealingly secured about the first socket mount, a second hollow fitting sealingly secured about the second socket mount, the electrical conducting apparatus extending sealingly from the housing through the second hollow fitting and exteriorly of the second hollow fitting, a third hollow fitting matingly and releasably secured to the second fitting, the electrical conducting apparatus connected to an input electrical cord which transmits electricity to the tubular light bulb, the input electrical cord extending from outside the device into the third hollow fitting through a hole therein, an electrical fluorescent bulb ballast interconnected with the input electrical cord, the ballast mounted within the housing or within the second hollow fitting.

11. The device of claim 4 further comprising
a buoyant member connected to the submersible lighting device so that it floats in water.

12. The device of claim 4 further comprising
the first socket mount having a recess therein configured to receive the first bulb socket in only one orientation and for holding the first bulb socket non-rotatively therein.

13. The device of claim 4 wherein the transparent rigid housing and hollow fittings are sealed water tight and the lighting device is submersible.

14. The device of claim 5 further comprising
the ballast further comprising an electrical ballast device mounted on a metal plate mounted above a layer of dielectric silicone.

15. The device of claim 4 further comprising
the transparent rigid housing transmitting light in a 360 degree circumference therefrom.

16. The device of claim 4 further comprising
an opaque member for preventing light from being transmitted in a selected arc from the tubular light bulb.

17. The device of claim 16 wherein the opaque member comprises a shield mounted to the device exteriorly of the transparent rigid housing.

18. The device of claim 4 further comprising
a weight suspended from a bolt through the first hollow fitting,
the first hollow fitting having a hollow open skirt portion;
the weight having a movable connector removably secured about the bolt, and
a portion of the movable connector protected within the skirt portion.

19. The device of claim 4 further comprising
the tubular light bulb, sockets, and electrical power conducting apparatus comprising a combination which is removable together from the transparent rigid housing through the second hollow fitting.

* * * * *